US011263271B2

(12) United States Patent
Takami

(10) Patent No.: US 11,263,271 B2
(45) Date of Patent: Mar. 1, 2022

(54) DIGITAL CONTENT VIEWING SYSTEM, DIGITAL CONTENT VIEWING METHOD, AND COMPUTER-READABLE RECORDING MEDIUM

(71) Applicant: BOOK WALKER Co., Ltd., Tokyo (JP)

(72) Inventor: Shinya Takami, Tokyo (JP)

(73) Assignee: BOOK WALKER CO., LTD., Tokyo (JP)

( * ) Notice: Subject to any disclaimer, the term of this patent is extended or adjusted under 35 U.S.C. 154(b) by 76 days.

(21) Appl. No.: 16/651,029

(22) PCT Filed: Sep. 6, 2019

(86) PCT No.: PCT/JP2019/035151
§ 371 (c)(1),
(2) Date: Mar. 26, 2020

(87) PCT Pub. No.: WO2020/054600
PCT Pub. Date: Mar. 19, 2020

(65) Prior Publication Data
US 2020/0250240 A1 Aug. 6, 2020

(30) Foreign Application Priority Data
Sep. 11, 2018 (JP) ............................ JP2018-170033

(51) Int. Cl.
*G06F 16/93* (2019.01)
*G06F 16/957* (2019.01)
(Continued)

(52) U.S. Cl.
CPC ............ *G06F 16/93* (2019.01); *G06F 16/951* (2019.01); *G06F 16/958* (2019.01); *G06F 16/9574* (2019.01)

(58) Field of Classification Search
CPC ........ G06F 8/36; G06F 16/93; G06F 16/9574; G06F 16/958; G06F 16/951
See application file for complete search history.

(56) References Cited

U.S. PATENT DOCUMENTS

2007/0201502 A1 8/2007 Abramson
2010/0312780 A1 * 12/2010 Le Chevalier ...... H04L 12/1859 707/759

(Continued)

FOREIGN PATENT DOCUMENTS

JP 2003-108464 4/2003
JP 2015-165416 9/2015

(Continued)

OTHER PUBLICATIONS

International Search Report dated Nov. 26, 2019 (Nov. 26, 2019), Application No. PCT/JP2019/035151, 4 pages.

*Primary Examiner* — Mariela Reyes
*Assistant Examiner* — Courtney Harmon
(74) *Attorney, Agent, or Firm* — Rankin, Hill & Clark LLP

(57) ABSTRACT

There are provided a digital content viewing system, a digital content viewing method, and a computer program, all of which make it possible to update a digital content that has been downloaded without downloading the entire digital content again if the digital content is updated. A digital content viewing system 1 includes a viewer terminal 5. The viewer terminal 5 includes: a configuration information file acquisition section 57A configured to check if a configuration information file corresponding to a digital content is stored in a data storage section 55 when the digital content is designated, and download the configuration information file OPF as necessary; and a content file acquisition section 57B configured to specify a corresponding content file on a basis of the configuration information file when the content (Continued)

file is designated, check if the content file having the same file name is stored in the data storage section 55, and download the content file as necessary.

7 Claims, 11 Drawing Sheets

(51) Int. Cl.
*G06F 16/958* (2019.01)
*G06F 16/951* (2019.01)

(56) References Cited

U.S. PATENT DOCUMENTS

| | | | | |
|---|---|---|---|---|
| 2013/0080887 | A1* | 3/2013 | Hou | G06F 40/205<br>715/273 |
| 2017/0180774 | A1 | 6/2017 | Kolhi et al. | |

FOREIGN PATENT DOCUMENTS

| | | |
|---|---|---|
| JP | 2017-191509 | 10/2017 |
| TW | I298842 B | 7/2008 |
| WO | 2015/011840 | 1/2015 |

* cited by examiner

Fig.6

| PAGE CONFIGURATION (a) | SPECIFIC INFORMATION (HASH VALUE) (b) |
|---|---|
| cover | cbc3a7fffa58b・・・ |
| 001 | 3c1baf9c90dc・・・ |
| 002 | d7656d6d4c1e・・・ |
| 003 | ce19c02e4c5a・・・ |
| 004 | 50cea6d2475d・・・ |

Fig.7

| PAGE CONFIGURATION | | SPECIFIC INFORMATION (HASH VALUE) (b) |
|---|---|---|
| (a−1) | (a−2) | |
| cover | cover | cbc3a7fffa58b・・・ |
| 001 | 001 | 3c1baf9c90dc・・・ |
| new page | 002 | af0ebe4c85f6・・・ |
| 002 | 003 | d7656d6d4c1e・・・ |
| 003 ONE CHARACTER CORRECTED | 004 | 43c450482e8e・・・ |
| 004 | 005 | 50cea6d2475d・・・ |

Fig.12

| PAGE CONFIGURATION (a) | MANAGEMENT NUMBER (b) |
|---|---|
| cover | 000000950624 |
| 001 | 000000956343 |
| 002 | 000000956344 |
| 003 | 000000956345 |
| 004 | 000000956346 |

Fig.13

| PAGE CONFIGURATION | | MANAGEMENT NUMBER (b) |
|---|---|---|
| (a−1) | (a−2) | |
| cover | cover | 000000950813 |
| 001 | 001 | 000000956652 |
| new page | 002 | 000000956653 |
| 002 | 003 | 000000956654 |
| 003 ONE CHARACTER CORRECTED | 004 | 000000956655 |
| 004 | 005 | 000000956656 |

DIGITAL CONTENT VIEWING SYSTEM, DIGITAL CONTENT VIEWING METHOD, AND COMPUTER-READABLE RECORDING MEDIUM

TECHNICAL FIELD

The present invention relates to a digital content viewing system configured to allow viewing of a digital content such as a digital or electronic magazine, a digital or electronic newspaper, and a digital or electronic book (hereinafter "digital content"), a digital content viewing method, and a computer-readable recording medium.

BACKGROUND ART

Digital contents are distributed in a variety of formats such as EPUB, PDF (Portable Document Format), HTML (Hyper Text Markup Language), and XML (Extensible Markup Language). Among these, EPUB is an open-format digital book file format standard formulated by the International Digital Publishing Forum (IDPF), and is widely spread as a de facto global standard.

FIG. 8 illustrates an example of the file configuration of the EPUB. As illustrated in FIG. 8, the EPUB includes a group of configuration files including a plurality of content files (such as XHTML files, PDF files, and JPG files) and a configuration information file (also referred to as an "OPF (Open Packaging Format) file") that indicates the file configuration of a plurality of electronic files including the plurality of content files. In this example, the EPUB also includes a plurality of interlocked files (which will be discussed later) interlocks with the plurality of content files.

FIG. 9 illustrates an overview of the configuration information file (OPF file). The configuration information file is mainly constituted from three elements, namely (1) metadata, (2) manifest, and (3) spine. The (1) metadata stores bibliographic information such as work title, author name, publisher name, language, file id, and date of update (including date and time). The (2) manifest defines the plurality of content files etc. which constitute the EPUB, and includes "IDs" assigned to such files. The (3) spine defines the order of arrangement of the plurality of content files.

According to the configuration information file (OPF file) in FIG. 9, an EPUB including "cover.xhtml, 001.xhtml, 002.xhtml, . . . ." arranged in this order is formed. The XHTML files reference corresponding JPG files (cover.xhtml references cover.jpg, for example). When this EPUB is opened, a viewer terminal displays "cover.jpg, 001.jpg, 002.jpg, . . . ".

Herein, files that constitute the body portion of a digital content to be displayed on the viewer terminal, such as the JPG files designated by the XHTML files, are defined as "content files", and a plurality of files interlocked with the plurality of content files, such as the XHTML files, are defined as "interlocked files". Herein, if there are a set of files for one certain page, the file with the largest file size may be defined as the content file, and the other files may be defined as interlocked files of the content file.

The other matters about the EPUB and the details of various types of tags are known and not directly relevant to the present invention. Therefore, references are made to "EPUB Publications 3.0.1" (http://www.idpf.org/epub/301/spec/epub-publications-20140626.html; date of search: Aug. 1, 2018), published by the IDPF, and "EBPAJ EPUB 3 Production Guide ver. 1.1.3, Jan. 1, 2015" (http://ebpaj.jp/images/ebpaj_epub3guide ver_1.1.3-150101.zip; date of search: Aug. 1, 2018), published by the Electronic Book Publishers Association of Japan, to omit description.

In the digital content viewing system operated by the applicant, when an EPUB is received from a publisher etc., the file names of the content files (e.g. JPG files) are converted into unique filenames (management numbers having regularity such as sequential numbers) determined utilizing numerical values using a content conversion section of a content management system (CMS), and the file names of the interlocked files (e.g. XHTML files) and the description in the configuration information file are also converted, so that the EPUB is managed and distributed. FIG. 10 illustrates the file names of the files that constitute the EPUB before and after a conversion by the content conversion section, and FIG. 11 schematically illustrates the configuration information file (OPF file) before and after a conversion by the content conversion section (only mainly converted portions are indicated in order to highlight the conversion; converted portions are underlined). In each of the drawings, the received EPUB is illustrated on the left side, and the EPUB after the conversion is illustrated on the right side. It is seen that the file names of the content files have been converted, and that the file names of the interlocked files and the description in the configuration information file also have been converted.

If the digital content is corrected or updated by replacing, adding, or deleting a page etc. (hereinafter "updated"), it is convenient if the digital content which has been downloaded also can be updated, since the amount of data to be downloaded is reduced.

In the digital content viewing system of the applicant, all the content files are downloaded again if the configuration information file (OPF file) has been updated with reference to the date of update in the (1) metadata in the configuration information file.

Meanwhile, in Japanese Unexamined Patent Application Publication No. 2017-191509 (JP 2017-191509 A1) (Patent Document 1), for example, upload numbers for managing digital book data are provided. In an update data checking process, a comparison is made between the upload number of downloaded digital book data and the upload number of digital book data in a management server, and if the upload number has been changed, it is determined that there are update data for the digital book, and the entire digital book data that have been updated are downloaded.

RELATED-ART DOCUMENT

Patent Document

[Patent Document 1] Japanese Unexamined Patent Application Publication No. 2017-191509 (JP 2017-191509 A1)

SUMMARY OF INVENTION

Technical Problem

With the digital content viewing system according to the related art and the system described in Patent Document 1, the entire digital content including unchanged pages is downloaded again even if a part of the digital content has been updated. This is, for the digital content viewing system by the applicant, for example, because of the following reason.

FIG. 12 illustrates the EPUB before the update illustrated in FIGS. 10 and 11 in a simplified form. The (a) field indicates the page configuration of the received EPUB, and the (b) field indicates the numerical values (management numbers) converted by the content conversion section and utilized for the file names etc. When there is an update in the page configuration of this EPUB as indicated in the (a-1) field in FIG. 13 (specifically insertion of a new page between "001" and "002" and correction of a typographical error in "003"), a new EPUB having a page configuration indicated in the (a-2) field is received from a publisher etc. When this EPUB is converted by the content conversion section, the file names etc. are converted into those which utilize new numerical values indicated in the (b) field in FIG. 13. Then, all the numerical values in the (b) field in FIG. 12 and all the numerical values in the (b) field in FIG. 13 are not matched, and all the content files are handled as different ones. After all, it is necessary for the viewer terminal to download the entire digital content including unchanged pages again.

It is an object of the present invention to provide a digital content viewing system, a digital content update method, and a computer-readable recording medium that make it possible to update a downloaded digital content and reduce the amount of data to be downloaded without downloading the entire digital content again if the digital content that has been downloaded is updated.

Solution to Problem

In a first aspect of the present invention, there is provided a digital content viewing system including a content management system that manages a digital content and a viewer terminal that acquires the digital content from the content management system.

The present invention is directed to a digital content composed of a group of configuration files (CF) including a plurality of content files and a configuration information file that indicates a file configuration of a plurality of electronic files including the plurality of content files. Examples of the digital content include a digital content in the EPUB format composed of a group of configuration files (CF) including at least a plurality of content files such as XHTML files, PDF files, and JPG files and an OPF file which is a configuration information file that indicates a file configuration. However, the configuration of the digital content is not limited to them, and the digital content may be in a different format.

The plurality of content files to be handled by the digital content viewing system according to the present invention each have a file name determined utilizing specific information (hereinafter referred to as "content file specific information") that is obtained utilizing a body portion of the content file and that enables the content file to be uniquely identified. In addition, the configuration information file specifies the plurality of content files utilizing the file name determined utilizing the content file specific information.

The "body portion of the content file" refers to a main portion that constitutes the content file excluding at least the file name of the content file. If no change has been made to the body portion of the content file, identical content file specific information is obtained. If any change has been made to even a part of the body portion of the content file, different content file specific information is obtained. Thus, the "file name determined utilizing the content file specific information" is the same file name if no change has been made to the body portion of the content file, and is a different file name that is distinguishable from other file names if any change has been made to even a part of the body portion of the content file. The "file name determined utilizing the content file specific information" includes a file name that is the content file specific information itself, a file name that includes the content file specific information as a part thereof, and a file name obtained by converting the content file specific information.

The viewer terminal includes a data storage section configured to store acquired data, a configuration information file acquisition section, and a content file acquisition section. The configuration information file acquisition section is configured to check if the configuration information file corresponding to the digital content is stored in the data storage section when the digital content is designated, acquire the configuration information file from the content management system and store the acquired configuration information file in the data storage section if the configuration information file corresponding to the digital content is not stored in the data storage section, check if the configuration information file which is held by the content management system has been updated if the configuration information file corresponding to the digital content is already stored in the data storage section, and acquire the updated configuration information file from the content management system and store the acquired updated configuration information file in the data storage section if the configuration information file has been updated.

The content file acquisition section is configured to specify the corresponding content file on a basis of the configuration information file which is stored in the data storage section when the content file which constitutes the digital content is designated, and check if the content file having the same file name is stored in the data storage section, and read the content file from the data storage section if the content file having the same file name is stored, and acquire the content file having the file name from the content management system, store the acquired content file in the data storage section, and read the content file if the content file having the same file name is not stored.

In the present invention, when a desired digital content being distributed is designated, the configuration information file acquisition section updates the configuration information file to the latest one. When a content file in the digital content is designated, the content file acquisition section checks if the content file has been acquired. In the present invention, the filename itself is determined utilizing specific information (content file specific information) that is obtained utilizing a body portion of the content file and that enables the content file to be uniquely identified. Therefore, the content file can be specified as

- the same file (to which no change has been made) if the content file has the same file name, and
- a different file (to which a change has been made) if the content file has a different file name.

It can be easily checked whether or not the content file has been acquired by just checking whether or not the data storage section stores a content file having the same file name as that of the designated content file. If the content file has been acquired, the content file is read from the data storage section without acquiring the content file anew, and only content files that have not been acquired are acquired from the content management system. Therefore, it is not necessary for the viewer terminal to download useless data.

The content file specific information may be any information that meets a condition that the information is obtained utilizing a body portion of the content file and enables the content file to be uniquely identified. For example, the content file specific information can be a hash value which is an output value of a hash function that receives, as an input, a body portion of each of the plurality of content files. The hash value is suitably utilized as the specific information, since the hash function generates different hash values on a basis of different data and the original data cannot be generated from hash values. Examples of the hash function include SHA-1, MD5, etc., for example.

The group of configuration files may include a plurality of interlocked files that operate in conjunction with the plurality of content files. Examples of the interlocked files include XHTML files that designate the content files (e.g. JPG files), thumbnail image files obtained by reducing the content of the content files which are image files (e.g. JPG files) or PDF files, and files obtained by saving the content files in a variety of file formats to support a variety of viewer terminals. If a plurality of interlocked files that operate in conjunction with the plurality of content files are included, the plurality of interlocked files can also each have a file name determined utilizing the content file specific information on the corresponding content file. Consequently, the correlation between the content files and the interlocked files that operate in conjunction therewith is clarified to facilitate handling of such files.

In contrast, the plurality of interlocked files may each have a file name determined utilizing specific information (hereinafter referred to as "interlocked file specific information") that is obtained utilizing a body portion of the interlocked file and that enables the interlocked file to be uniquely identified. Consequently, only the interlocked files can also be individually updated, separately from the content files.

The content management system includes a content conversion section configured to convert a received digital content composed of a group of configuration files into a format for management and distribution. Specifically, the content management system comprises a content conversion section that receives, as an input, a group of configuration files having a plurality of content files having a desired file name and a configuration information file that specifies the plurality of content files utilizing the desired file name, and that outputs a group of configuration files having the plurality of content files having the file name determined utilizing the content file specific information and the configuration information file which specifies the plurality of content files utilizing the file name determined utilizing the content file specific information.

If a plurality of interlocked files are included in the group of configuration files, the content conversion section may convert the plurality of interlocked files having a desired file name into a plurality of interlocked files having a file name determined utilizing the content file specific information or a plurality of interlocked files having a file name determined utilizing the interlocked file specific information.

In a second aspect of the present invention, the invention can also be understood as a digital content viewing method. In a digital content viewing method of viewing a digital content using a viewer terminal implemented using a computer and including a data storage section configured to acquire the digital content from a content management system and store acquired data, the content management system being implemented using a computer and configured to manage the digital content, and the digital content being composed of a group of configuration files including a plurality of content files and a configuration information file that indicates a file configuration of a plurality of electronic files including the plurality of content files, the plurality of content files each have a file name determined utilizing specific information (content file specific information) that is obtained utilizing a body portion of the content file and that enables the content file to be uniquely identified; and the configuration information file specifies the plurality of content files utilizing the file name determined utilizing the content file specific information. The viewer terminal checks if the configuration information file corresponding to the digital content is stored in the data storage section of the viewer terminal when the digital content is designated, and acquires the configuration information file from the content management system and stores the acquired configuration information file in the data storage section if the configuration information file corresponding to the digital content is not stored in the data storage section, checks if the configuration information file which is held by the content management system has been updated if the configuration information file corresponding to the digital content is already stored in the data storage section, and acquires the updated configuration information file from the content management system and stores the acquired updated configuration information file in the data storage section if the configuration information file has been updated. The viewer terminal specifies the corresponding content file on a basis of the configuration information file which is stored in the data storage section when the content file which constitutes the digital content is designated, and checks if the content file having the same file name is stored in the data storage section, and reads the content file from the data storage section if the content file having the same file name is stored, and acquires the content file from the content management system, stores the acquired content file in the data storage section, and reads the content file if the content file having the same file name is not stored. The digital content viewing method according to the present invention can incorporate some or all of the characteristics of the first aspect as necessary or as appropriate.

The content file specific information may be a hash value which is an output value of a hash function that receives, as an input, a body portion of each of the plurality of content files.

The content management system may comprise a content conversion section that receives, as an input, a group of configuration files having a plurality of content files having a desired file name and a configuration information file that specifies the plurality of content files utilizing the desired file name, and that outputs a group of configuration files having the plurality of content files having the file name determined utilizing the content file specific information and the configuration information file which specifies the plurality of content files utilizing the file name determined utilizing the content file specific information.

The group of configuration files may include a plurality of interlocked files interlocked with the plurality of content files; and the plurality of interlocked files may each have a file name determined utilizing the content file specific information on the corresponding content file.

The group of configuration files may include a plurality of interlocked files interlocked with the plurality of content files; and the plurality of interlocked files may each have a file name determined utilizing interlocked file specific information that is obtained utilizing a body portion of the interlocked file and that enables the interlocked file to be uniquely identified.

The content management system may comprise a content conversion section that receives, as an input, a group of configuration files having a plurality of content files having a desired file name, a plurality of interlocked files having a desired file name, and a configuration information file that specifies the plurality of content files utilizing the desired file name, and that outputs a group of configuration files having the plurality of content files having the file name determined utilizing the content file specific information, the plurality of interlocked files having the file name determined utilizing the content file specific information, and the configuration information file which specifies the plurality of content files utilizing the file name determined utilizing the content file specific information.

The content management system may comprise a content conversion section that receives, as an input, a group of configuration files having a plurality of content files having a desired file name, a plurality of interlocked files having a desired file name, and a configuration information file that specifies the plurality of content files utilizing the desired file name, and that outputs a group of configuration files having the plurality of content files having the file name determined utilizing the content file specific information, the plurality of interlocked files having the file name determined utilizing the interlocked file specific information, and the configuration information file which specifies the plurality of content files utilizing the file name determined utilizing the content file specific information and which specifies the plurality of interlocked files utilizing the interlocked file specific information.

The present invention may be implemented as a computer-readable recording medium comprising instructions causing a computer, when executed by the computer, to execute the digital content viewing method according to the present invention.

The present invention can also be understood as a computer program for viewing a digital content. In a computer program for viewing a digital content to be installed in and executed by a viewer terminal configured to acquire the digital content from a content management system, the content management system being configured to manage the digital content, and the digital content being composed of a group of configuration files including a plurality of content files and a configuration information file that indicates a file configuration of a plurality of electronic files including the plurality of content files. The plurality of content files each have a file name determined utilizing specific information (content file specific information) that is obtained utilizing a body portion of the content file and that enables the content file to be uniquely identified. The configuration information file specifies the plurality of content files utilizing the file name determined utilizing the content file specific information. The computer program for viewing a digital content is configured to implement, in the viewer terminal, a configuration information file acquisition section configured to check if the configuration information file corresponding to the digital content is stored in the data storage section of the viewer terminal when the digital content is designated, acquire the configuration information file from the content management system and store the acquired configuration information file in the data storage section if the configuration information file corresponding to the digital content is not stored in the data storage section, check if the configuration information file which is held by the content management system has been updated if the configuration information file corresponding to the digital content is already stored in the data storage section, and acquire the updated configuration information file from the content management system and store the acquired updated configuration information file in the data storage section if the configuration information file has been updated; and a content file acquisition section configured to specify the corresponding content file on a basis of the configuration information file which is stored in the data storage section when the content file which constitutes the digital content is designated, and check if the content file having the same file name is stored in the data storage section, and read the content file from the data storage section if the content file having the same file name is stored, and acquire the content file from the content management system, store the acquired content file in the data storage section, and read the content file if the content file having the same file name is not stored. As a matter of course, this program may be stored in a computer-readable recording medium. The computer program for viewing a digital content and the computer-readable recording medium according to the present invention can incorporate some or all of the characteristics of the first aspect as necessary or as appropriate.

BRIEF DESCRIPTION OF DRAWINGS

FIG. 6 illustrates an EPUB before an update in a simplified manner.

FIG. 7 illustrates the EPUB after the update in a simplified manner.

FIG. 12 illustrates an EPUB according to the related art before an update in a simplified manner.

FIG. 13 illustrates the EPUB according to the related art after the update in a simplified manner.

DESCRIPTION OF EMBODIMENTS

Figure 1:
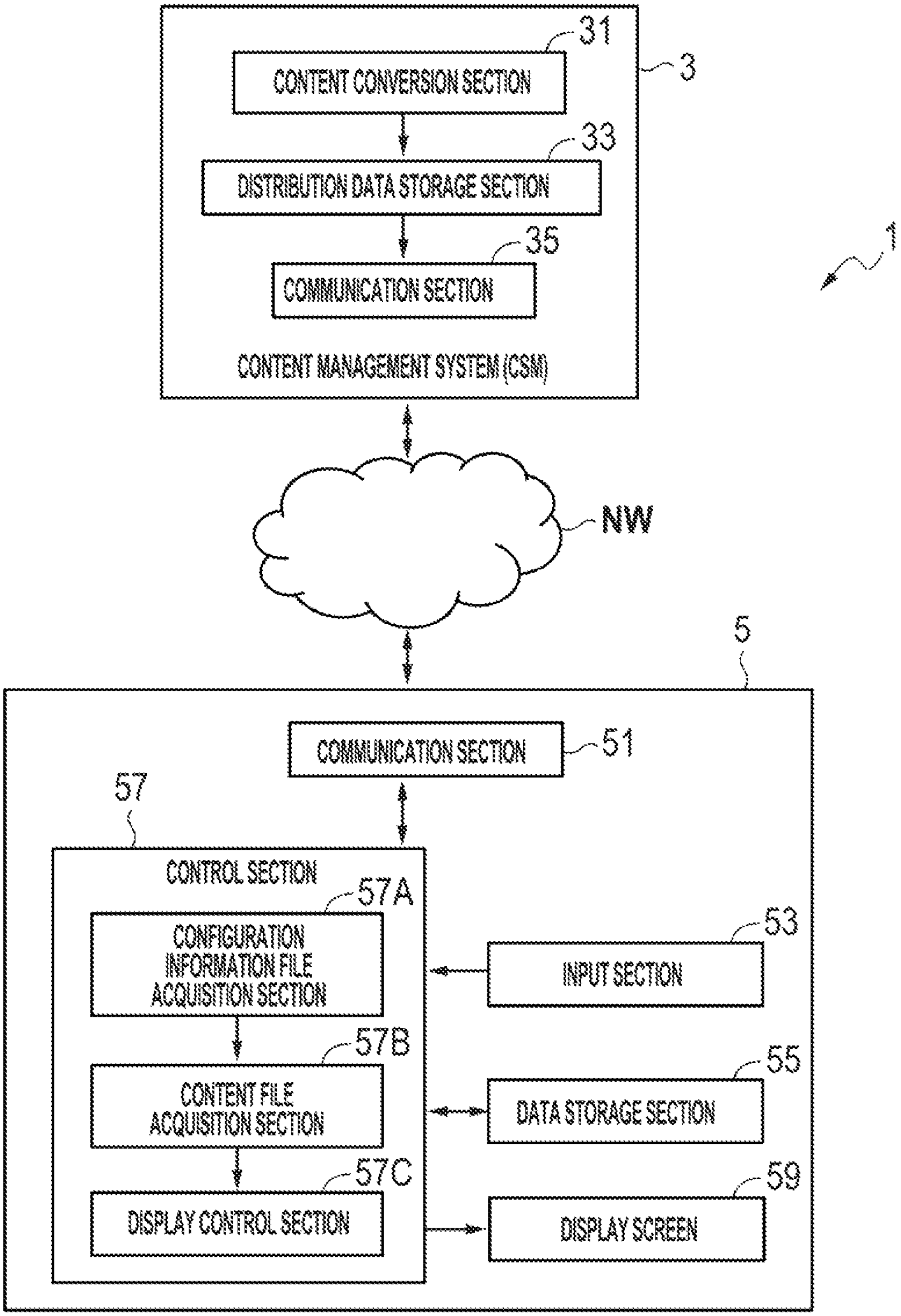
FIG. 1 is a block diagram illustrating the configuration of a digital content viewing system according to an embodiment of the present invention.

A digital content viewing system according to an embodiment of the present invention will be described in detail below with reference to the drawings. FIG. 1 is a block diagram illustrating the configuration of the digital content viewing system according to the embodiment of the present invention.

<Digital Content Viewing System>

As illustrated in FIG. 1, a digital content viewing system 1 according to the present embodiment is mainly constituted from a content management system 3 configured to manage a digital content and a viewer terminal 5 connected to the content management system 3 via an electric communication line NW to acquire the digital content from the content management system. The digital content viewing system 1 according to the present embodiment is directed to a digital content such as a digital or electronic magazine, a digital or electronic newspaper, and a digital or electronic book in an EPUB format.

The content management system 3 is a so-called content management system (CMS), and includes a content conversion section 31 configured to convert a received EPUB, a distribution data storage section 33 configured to store a converted digital content, and a communication section 35.

The viewer terminal 5 is assumed to be a general-purpose terminal such as a cellular phone, a smartphone, and a personal computer. However, the present invention is not limited to them, and the viewer terminal 5 may include a dedicated device for viewing a digital content, etc. If the viewer terminal 5 is a general-purpose terminal, the user of the present system has a computer program for viewing a digital content installed in his/her own viewer terminal 5 in advance. Consequently, the digital content viewing system 1 is constructed for the user by executing the computer program for viewing a digital content. The user can utilize the digital content viewing system 1 via the computer program for viewing a digital content by operating his/her own viewer terminal 5. The computer program for viewing a digital content may be obtained in any manner, and may be included in the viewer terminal 5 in advance, or may be obtained from a computer-readable medium or from a server via the electric communication line NW.

The viewer terminal 5 is constituted from a communication section 51 for connection to the electric communication line NW, an input section 53, a data storage section 55, a control section 57, and a display screen 59. The input section 53 may be a numeric keypad for a cellular phone, may be a touch screen disposed to cover the display screen 59 for a smartphone, and may be a mouse and a keyboard or a touch screen for a personal computer. The data storage section 55 stores data on a digital content downloaded from the content management system 3.

A configuration information file acquisition section 57A, a content file acquisition section 57B, and a display control section 57C are implemented in the control section 57 of the viewer terminal 5 by installing the computer program for viewing a digital content in the viewer terminal 5.

When a digital content is designated, the configuration information file acquisition section 57A checks if a configuration information file corresponding to the digital content is stored in the data storage section 55, and downloads a configuration information file OPF from the content management system 3 as necessary. When a content file that constitutes the digital content is designated, the content file acquisition section 57B specifies the corresponding content file on a basis of the configuration information file which is stored in the data storage section 55, checks if the content file having the same file name is stored in the data storage section 55, downloads the content file from the content management system 3 as necessary, and reads data from the data storage section 55 and converts such data into display data. The display control section 57C outputs an image display signal on a basis of an output from the content file acquisition section 57B, and displays an image on the display screen 59.

<Conversion by Content Conversion Section>

As discussed above, the system according to the present embodiment is directed to a digital content in the EPUB format. When an EPUB is received from a publisher etc., the content management system 3 converts the EPUB into a format that is suitable for management and distribution and is stored in the distribution data storage section 33. A digital content in the EPUB format is originally constituted of one file prepared by compressing one folder containing all the files (a group of configuration files) that constitute the digital content into a ZIP format. In the present embodiment, however, each of the group of constituent files in the EPUB format is individually stored in the distribution data storage section 33 to be individually downloadable.

Figure 2:
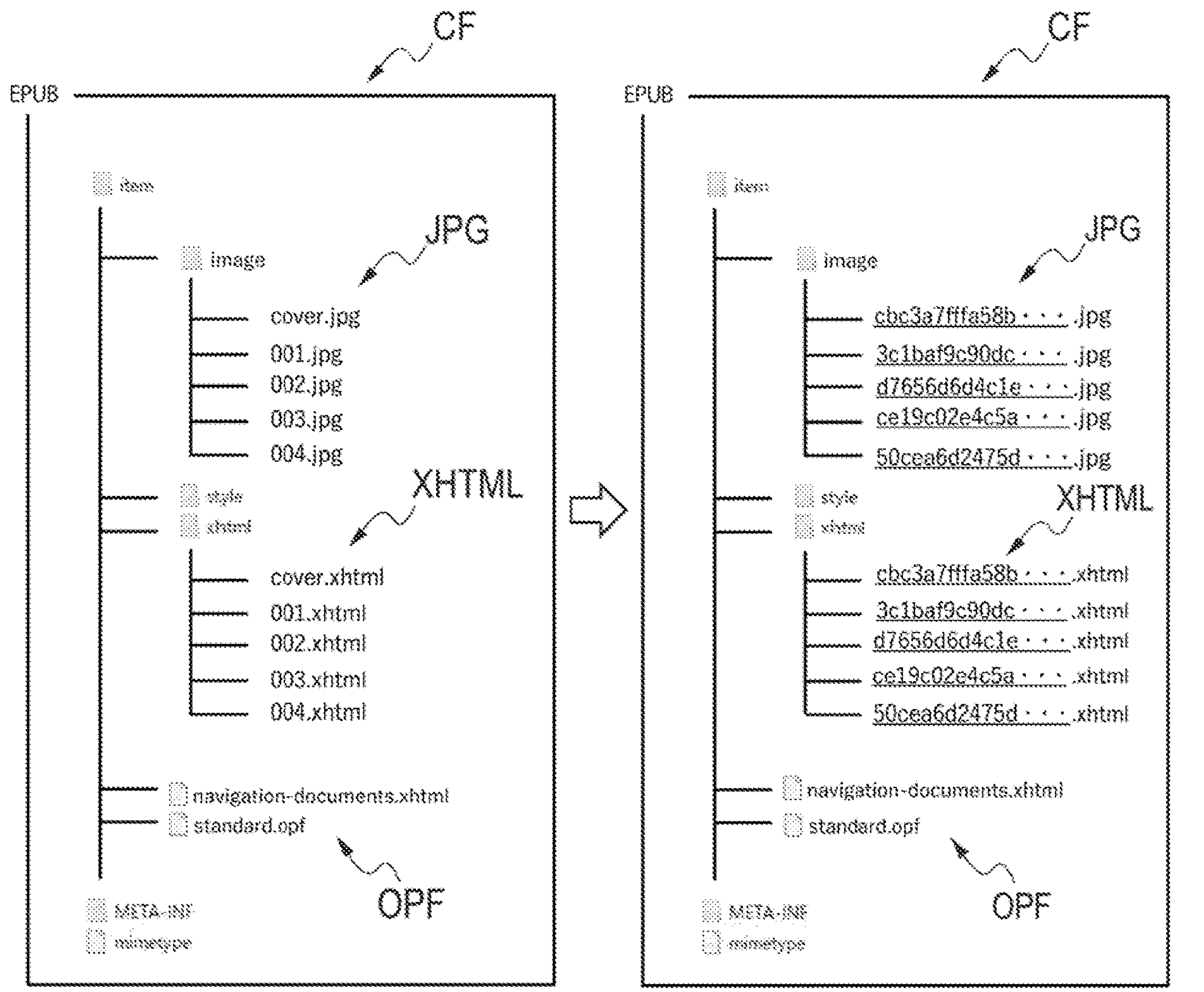
FIG. 2 indicates the file names of files that constitute an EPUB before and after a conversion by a content conversion section.
Figure 3:
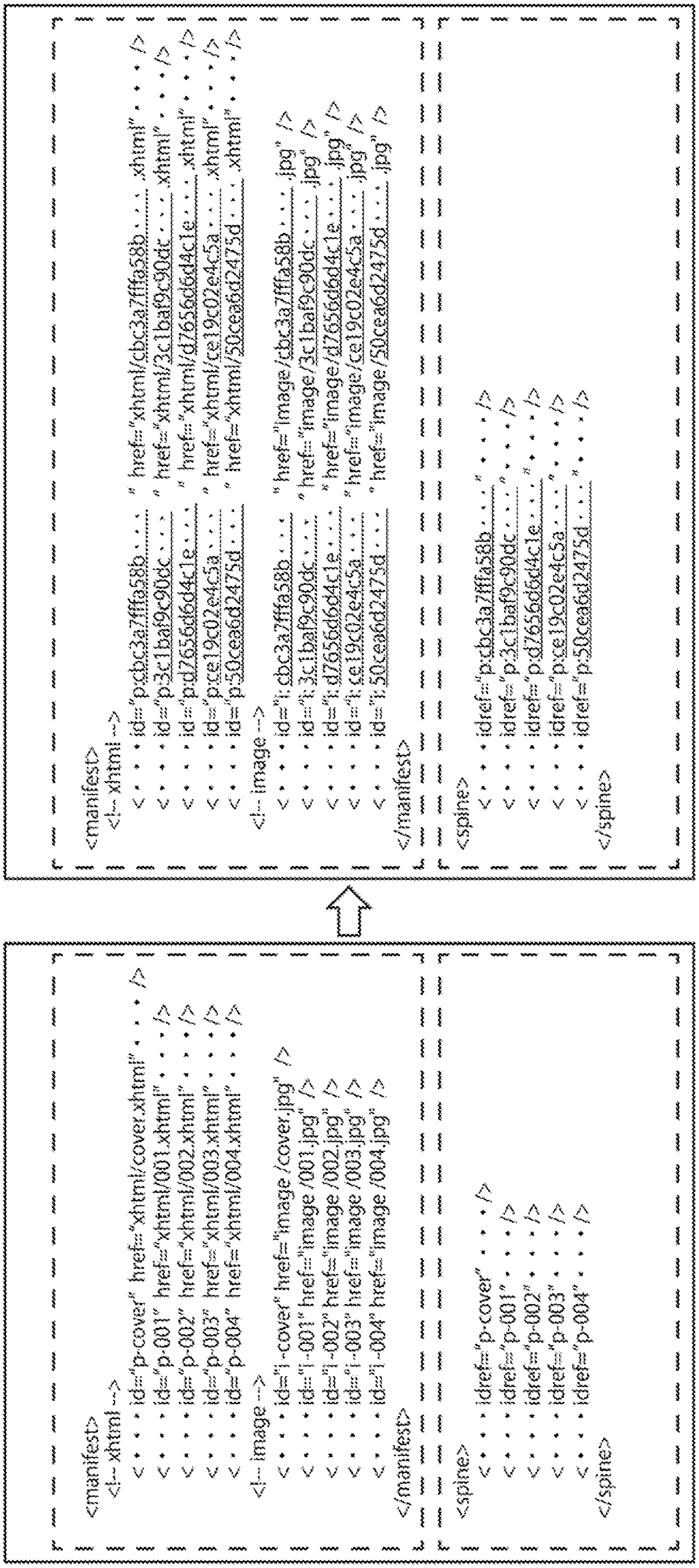
FIG. 3 is a schematic diagram illustrating a configuration information file before and after a conversion by the content conversion section.

FIG. 2 indicates the file names of files that constitute an EPUB before and after a conversion by the content conversion section 31. FIG. 3 is a schematic diagram illustrating the configuration information file OPF before and after a conversion by the content conversion section 31 (only mainly converted portions are indicated in order to highlight the conversion; converted portions are underlined). In each of the drawings, the received EPUB is illustrated on the left side, and the EPUB after the conversion is illustrated on the right side. In the present embodiment, as illustrated in FIG. 2, the file names of content files (JPG files) are converted into hash values (content file specific information) which are output values from a hash function obtained by inputting the body portion (not including the original file name) of each of the content files (in the present example, the hash values have 64 characters, and are partially omitted in FIG. 2 because of the large number of the characters). In addition, the file names of interlocked files (XHTML files) also utilize the hash values (content file specific information) of the corresponding content files. The configuration information file OPF also specifies the content files by utilizing the file names that utilize the hash values (content file specific information).

<Viewing of Digital Content>

A flow in which the user views a digital content will be described below with reference to FIGS. 4 and 5.

[Initial Download]

Figure 4:
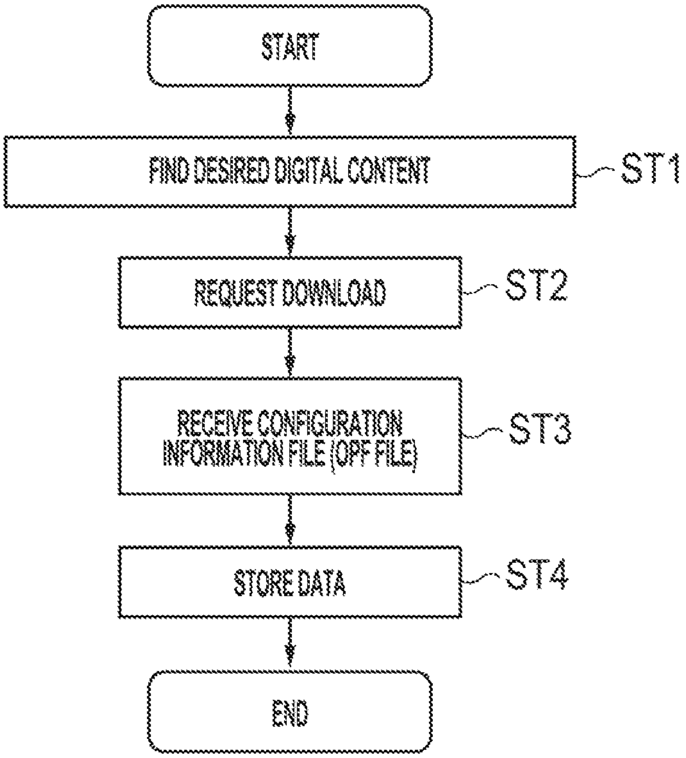
FIG. 4 is a flowchart illustrating an example of a process performed at the time of initial download.

In the initial download, the process is performed along the flow in FIG. 4. The user finds a desired digital content using the viewer terminal 5 (step ST1). The user may find a digital content in any manner. For example, the user may use a search engine etc. displayed by starting the computer program for viewing a digital content, or may find one from a list of viewable digital contents displayed on a website of an operator who operates the digital content viewing system 1. When a desired digital content is found, the user selects the digital content using the input section 53. Then, the configuration information file acquisition section 57A checks if a configuration information file OPF corresponding to the digital content is stored in the data storage section 55. At the time of the initial download, there is no configuration information file OPF in the data storage section 55, and therefore the configuration information file acquisition section 57A requests download from the content management system 3 (step ST2). Upon receiving a download request, the content management system 3 reads the configuration information file OPF of the corresponding digital content from the distribution data storage section 33, and transmits the configuration information file OPF to the viewer terminal 5. The viewer terminal 5 receives the configuration information file OPF (step ST3), and stores the received configuration information file OPF in the data storage section 55 (step ST4).

[Viewing of Content File]

Figure 5:
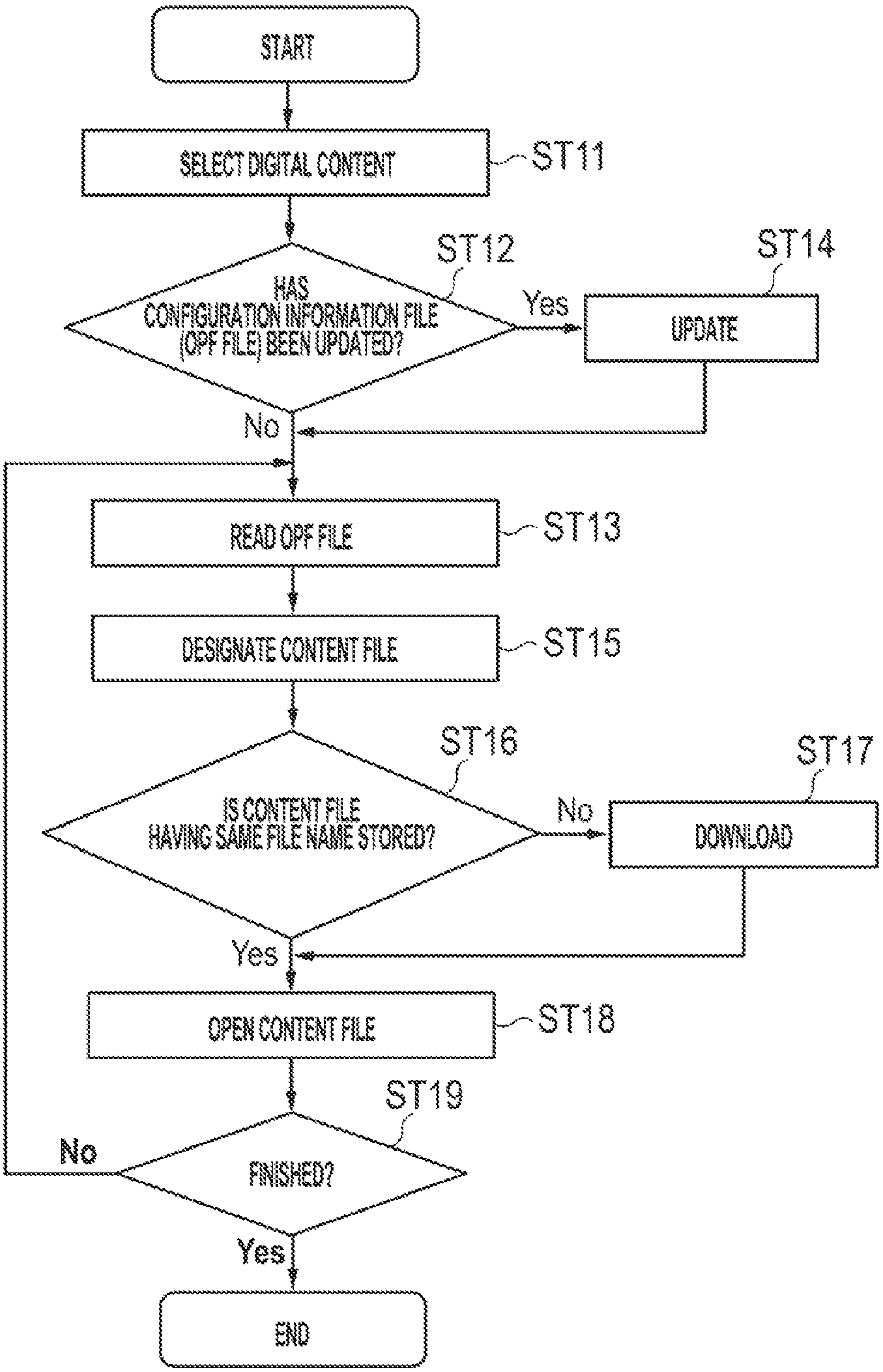
FIG. 5 is a flowchart illustrating an example of a process performed before viewing a content file.
Figure 8:
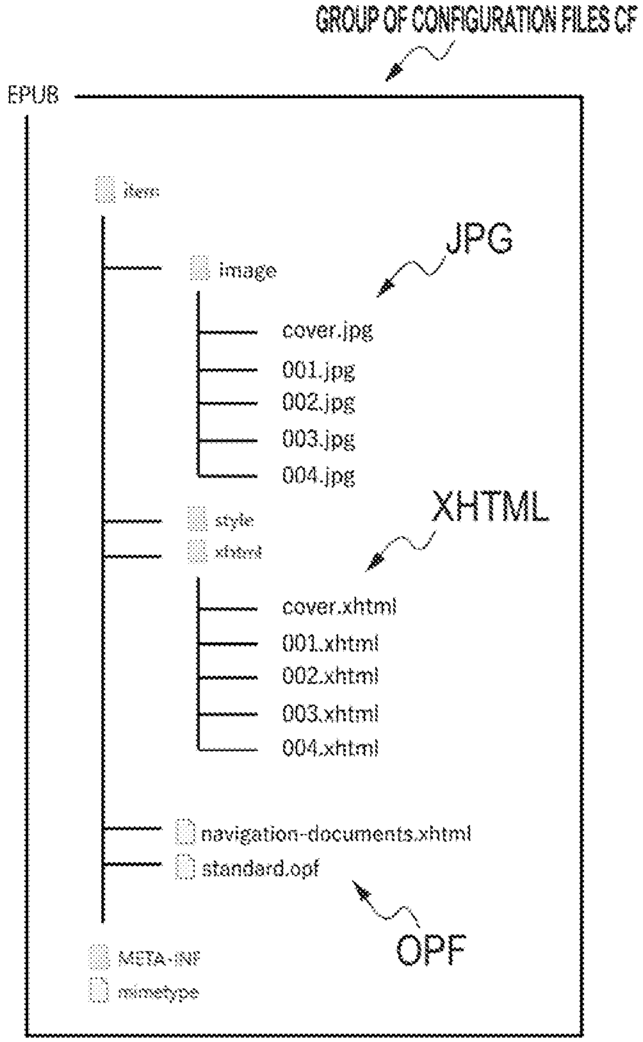
FIG. 8 illustrates an example of the file configuration of the EPUB.
Figure 9:
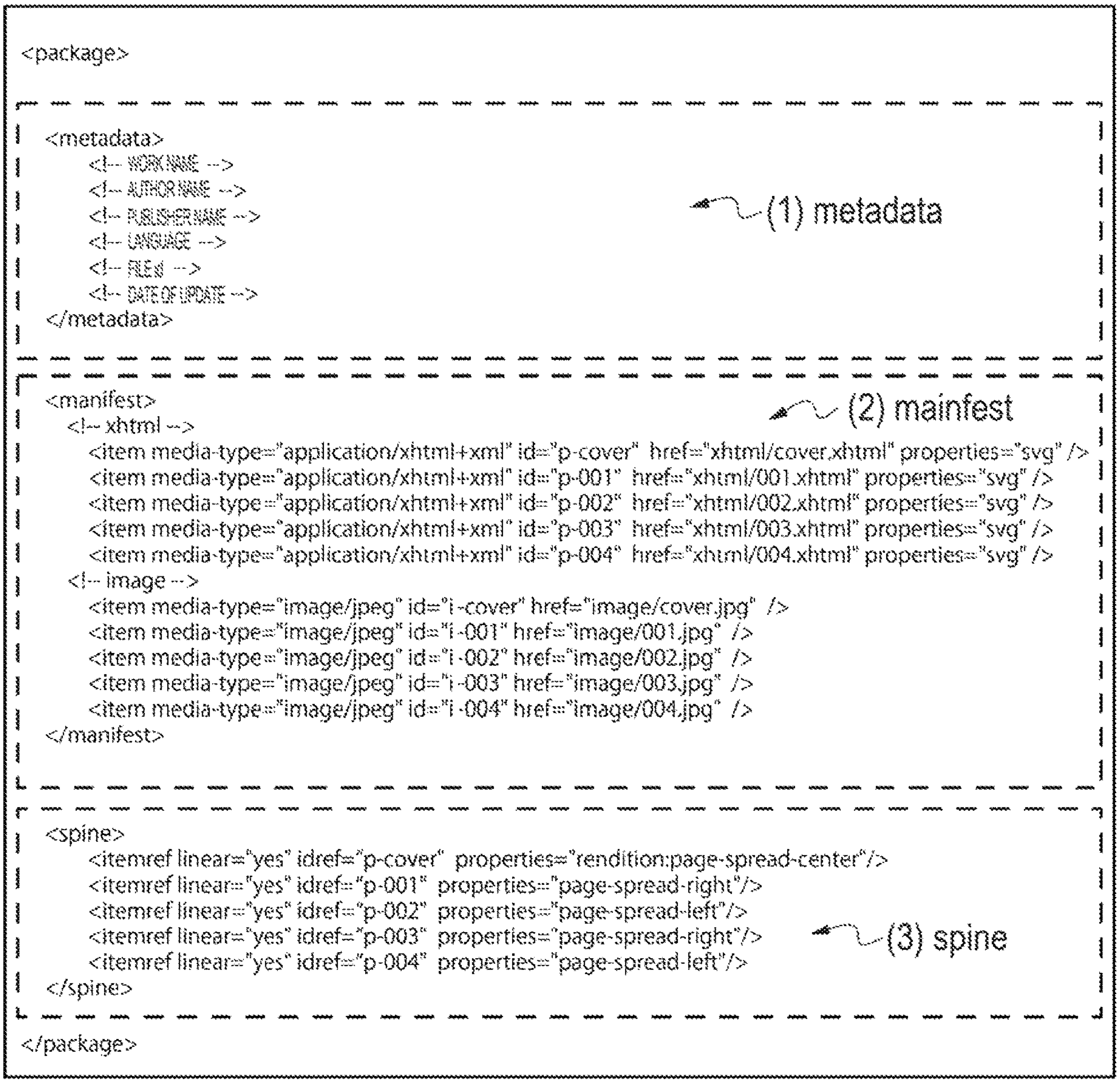
FIG. 9 illustrates an overview of the configuration information file.
Figure 10:
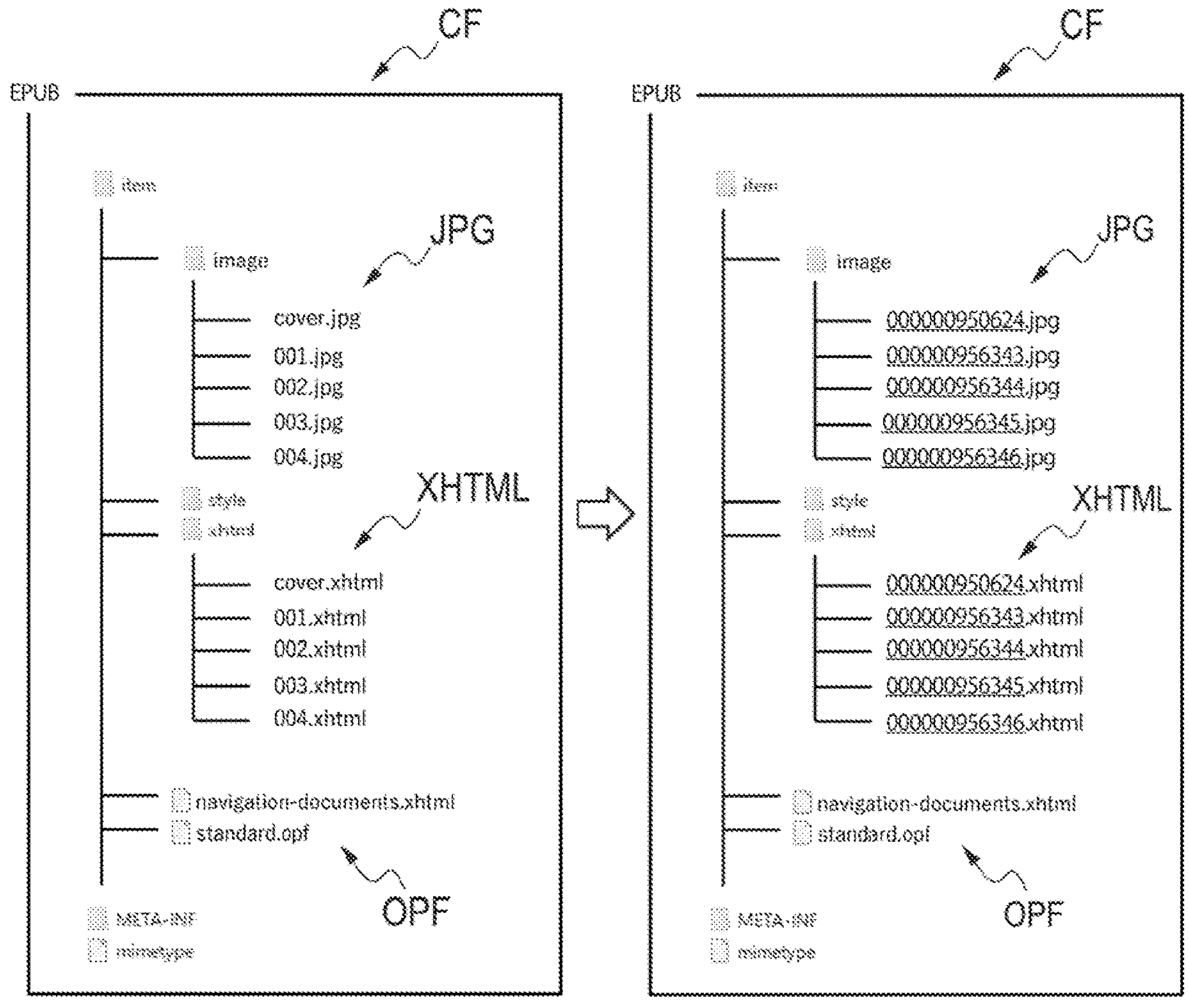
FIG. 10 indicates the file names of files that constitute an EPUB before and after a conversion by a content conversion section according to the related art.
Figure 11:
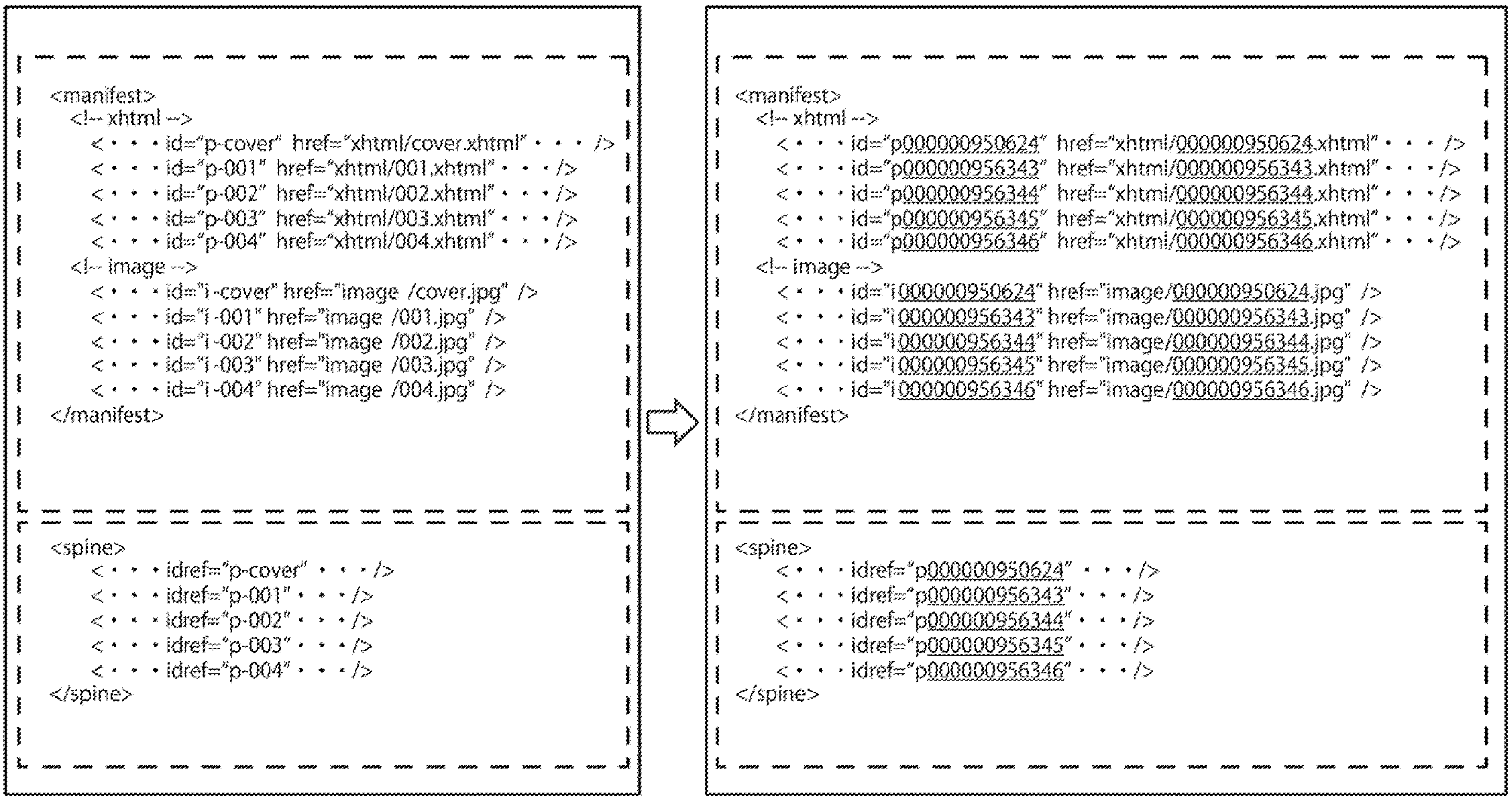
FIG. 11 is a schematic diagram illustrating a configuration information file before and after a conversion by the content conversion section according to the related art.

To view a content file, the process is performed along the flow in FIG. 5. The user selects a digital content, the configuration information file OPF of which has been downloaded, using the viewer terminal 5 (step ST11). Then, the configuration information file acquisition section 57A checks if the configuration information file OPF which is held by the content management system 3 has been updated (step ST12). The presence or absence of an update is checked by making a comparison between the "file id" and "date of update" in the configuration information file OPF stored in the data storage section 55 and the "file id" and the "date of update" in the configuration information file OPF stored in the distribution data storage section 33. If digital contents specified by the "file ids" have the same "date of update", it is determined that the digital content has not been updated, and the configuration information file OPF stored in the data storage section 55 is read (step ST13). If the digital content has been updated, that is, the "date of update" in the configuration information file OPF stored in the distribution data storage section 33 is more recent, it is determined that the digital content has been updated, and the newer configuration information file OPF is downloaded to overwrite the configuration information file OPF stored in the data storage section 55 (step ST14), and the newer configuration information file OPF is read (step ST13). Here, it is assumed that the electronic file has not been updated. The process for a case where the electronic file has been updated will be discussed later.

Subsequently, when the user designates a content file (page) included in the digital content that he/she desires to view (step ST15), the content file acquisition section 57B specifies a corresponding content file on a basis of the configuration information file OPF, and checks if a content file having the file name is stored in the data storage section 55 (step ST16). The content file may be designated by sequentially opening the cover, the first page, the second page, . . . of the digital content, or by designating a page in the middle, for example. When a content file of the digital content is opened for the first time, the content file is not stored in the data storage section 55. Therefore, the content file acquisition section 57B downloads the content file from the distribution data storage section 33 of the content management system 3 and stores the content file in the data storage section 55 (step ST17), and opens the content file (step ST18). At this time, an image of the content file is displayed on the display screen 59 of the viewer terminal 5. When the content file is displayed again or the same content file is opened for the second time or later, the content file is already stored in the data storage section 55. Therefore, the content file can be read from the data storage section 55 without downloading the content file (step ST18). After that, steps ST13 to ST18 are repeatedly performed until viewing of the desired content file is finished (step ST19).

<If Digital Content has been Updated>

Next, a process performed if the content of the digital content has been updated in the viewer terminal 5 which has viewed all the pages of the digital content (i.e. content files corresponding to the cover and the pages 001 to 004 are already stored in the data storage section 55) will be described.

FIG. 6 illustrates an EPUB before an update illustrated in FIGS. 2 and 3 in a simplified form. The (a) field indicates the page configuration of the received EPUB, and the (b) field indicates the specific information (hash values) converted by the content conversion section and utilized for the file names etc. When there is an update in the page configuration of this EPUB as indicated in the (a-1) field in FIG. 7 (specifically insertion of a new page between "001" and "002" and correction of a typographical error in "003"), a new EPUB having a page configuration indicated in the (a-2) field is received from a publisher etc. When this EPUB is converted by the content conversion section, the file names etc. are converted into those which utilize new numerical values indicated in the (b) field in FIG. 7 and are stored in the distribution data storage section 33.

When a digital content is selected (step ST11), the configuration information file acquisition section 57A checks if the configuration information file OPF which is held by the content management system 3 has been updated (step ST12). In this case, the "date of update" in the configuration information file OPF stored in the distribution data storage section 33 is more recent, and thus it is determined that the digital content has been updated, and the newer configuration information file OPF is downloaded to overwrite the configuration information file OPF stored in the data storage section 55 (step ST14), and the newer configuration information file OPF is read (step ST13).

Subsequently, when the user designates a content file (page) included in the digital content that he/she desires to view (step ST15), the content file acquisition section 57B specifies a corresponding content file on a basis of the configuration information file OPF, and checks if a content file having the file name is stored in the data storage section 55 (step ST16). For example, when the first content file (cover page) is designated according to the configuration information file OPF, there is already a file named "cbc3a7fffa58b . . . . xhtml" in the data storage section 55, and therefore "cbc3a7fffa58b . . . . xhtml" is read from the data storage section 55 without newly downloading the file (step ST18). Similarly, when the next content file (first page) is designated, "3c1baf9c90dc . . . . xhtml" stored in the data storage section 55 is read. Here, when the next content file (second page) is further designated, there is no file named "af0ebe4c85f6 . . . . xhtml" in the data storage section 55, since this is a new page. Therefore, the content file acquisition section 57B downloads a content file having a file name "af0ebe4c85f6 . . . . xhtml" from the distribution data storage section 33 of the content management system 3 and stores the content file in the data storage section 55 (step ST17), and opens the content file (step ST18).

Similarly, the third to fifth pages are also processed as follows:

Third page: "d7656d6d4c1e . . . . xhtml" is read from the data storage section 55.

Fourth page: "43c450482e8e . . . . xhtml" is downloaded from the distribution data storage section 33.

Fifth page: "50cea6d2475d . . . . xhtml" in the data storage section 55 is read.

As a result, to view the EPUB after the update in this example, it is possible to view all the pages included in the EPUB by just downloading only the second page which is a new page and the fourth page which has been corrected to open such pages.

The above embodiment is described by way of example only, and may be modified without departing from the scope and spirit of the present invention. For example, an EPUB is taken as an example of the format of digital contents in the above example. However, the present invention may also be directed to any group of configuration files having content files and a configuration information file.

In the above example, in addition, the content files are JPG files, and the interlocked files are XHTML files. As a matter of course, however, such files may be a combination of files in different file formats, and the interlocked files may include a plurality of types of files. In addition, the interlocked files may each have a file name determined utilizing interlocked file specific information that is obtained utilizing a body portion of the interlocked file and that enables the interlocked file to be uniquely identified. As a matter of course, no interlocked files may be included if not necessary.

In the above example, in addition, hash values are utilized as the specific information (content file specific information and interlocked file specific information). However, any information that meets the condition may be utilized.

INDUSTRIAL APPLICABILITY

According to the present invention, it is possible to provide a digital content viewing system, an digital content update method, and a computer program for viewing a digital content, all of which make it possible to update a downloaded digital content and reduce the amount of data to be downloaded without downloading the entire digital content again if the digital content that has been downloaded is updated.

DESCRIPTION OF REFERENCE NUMERALS

1 digital content viewing system
3 content management system
31 content conversion section
33 distribution data storage section
35 communication section
5 viewer terminal
51 communication section
53 input section
55 data storage section
57 control section
57A configuration information file acquisition section
57B content file acquisition section
57C display control section
59 display screen

The invention claimed is:

1. A digital content viewing system comprising a viewer terminal configured to acquire a digital content from a content management system configured to manage the digital content, the digital content being composed of a group of configuration files including a plurality of content files and a configuration information file that indicates a file configuration of a plurality of electronic files including the plurality of content files, wherein:

the plurality of content files each have a file name determined utilizing content file specific information that is obtained utilizing a body portion of the content file and that enables the content file to be uniquely identified;

the configuration information file specifies the plurality of content files utilizing the file name determined utilizing the content file specific information; and the viewer terminal has a computer program installed therein to configure the viewer terminal to:

store acquired data;

check if the configuration information file corresponding to the digital content is stored when the digital content is designated, acquire the configuration information file from the content management system and store the acquired configuration information file if the configuration information file corresponding to the digital content is not stored, check if the configuration information file which is held by the content management system has been updated if the configuration information file corresponding to the digital content is already stored, and acquire the updated configuration information file from the content management system and store the acquired updated configuration information file if the configuration information file has been updated; and specify the corresponding content file on a basis of the configuration information file which is stored when the content file which constitutes the digital content is designated, and check if the content file having the same file name is stored, and read the content file if the content file having the same file name is stored, and acquire the content file from the content management system, store the acquired content file, and read the content file if the content file having the same file name is not stored.

2. The digital content viewing system according to claim 1, wherein the content file specific information is a hash value which is an output value of a hash function that receives, as an input, a body portion of each of the plurality of content files.

3. The digital content viewing system according to claim 1, wherein the content management system has a computer program installed therein to configure the content management system to receive, as an input, a group of configuration files having a plurality of content files having a desired file name and a configuration information file that specifies the plurality of content files utilizing the desired file name, and to output a group of configuration files having the plurality of content files having the file name determined utilizing the content file specific information and the configuration information file which specifies the plurality of content files utilizing the file name determined utilizing the content file specific information.

4. The digital content viewing system according to claim 1, wherein the group of configuration files include a plurality of interlocked files interlocked with the plurality of content files; and the plurality of interlocked files each have a file name determined utilizing the content file specific information on the corresponding content file.

5. The digital content viewing system according to claim 4, wherein the content management system has a computer program installed therein to configure the content management system to receive, as an input, a group of configuration files having a plurality of content files having a desired file name, a plurality of interlocked files having a desired file name, and a configuration information file that specifies the plurality of content files utilizing the desired file name, and to output a group of configuration files having the plurality of content files having the file name determined utilizing the content file specific information, the plurality of interlocked files having the file name determined utilizing the content file specific information, and the configuration information file which specifies the plurality of content files utilizing the file name determined utilizing the content file specific information.

6. The digital content viewing system according to claim 1, wherein:

the group of configuration files include a plurality of interlocked files interlocked with the plurality of content files; and the plurality of interlocked files each have a file name determined utilizing interlocked file specific information that is obtained utilizing a body portion of the interlocked file and that enables the interlocked file to be uniquely identified.

7. The digital content viewing system according to claim 6, wherein the content management system has a computer program installed therein to configure the content management system to receive, as an input, a group of configuration files having a plurality of content files having a desired file name, a plurality of interlocked files having a desired file name, and a configuration information file that specifies the plurality of content files utilizing the desired file name, and to output a group of configuration files having the plurality of content files having the file name determined utilizing the content file specific information, the plurality of interlocked files having the file name determined utilizing the interlocked file specific information, and the configuration information file which specifies the plurality of content files utilizing the file name determined utilizing the content file specific information and which specifies the plurality of interlocked files utilizing the interlocked file specific information.

* * * * *